(12) United States Patent
Denli et al.

(10) Patent No.: US 11,609,352 B2
(45) Date of Patent: Mar. 21, 2023

(54) MACHINE LEARNING-AUGMENTED GEOPHYSICAL INVERSION

(71) Applicant: ExxonMobil Upstream Research Company, Spring, TX (US)

(72) Inventors: Huseyin Denli, Basking Ridge, NJ (US); Kuang-Hung Liu, Basking Ridge, NJ (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 533 days.

(21) Appl. No.: 16/683,120

(22) Filed: Nov. 13, 2019

(65) Prior Publication Data

US 2020/0183041 A1    Jun. 11, 2020

Related U.S. Application Data

(60) Provisional application No. 62/777,872, filed on Dec. 11, 2018.

(51) Int. Cl.
*G01V 1/48* (2006.01)
*G06N 3/08* (2006.01)
*G06N 3/04* (2023.01)

(52) U.S. Cl.
CPC ............. *G01V 1/48* (2013.01); *G06N 3/0454* (2013.01); *G06N 3/08* (2013.01)

(58) Field of Classification Search
CPC ... G01V 1/48; G01V 1/44; G01V 1/40; G01V 1/00; G01V 11/00; G01V 99/005;
(Continued)

(56) References Cited

U.S. PATENT DOCUMENTS 8,688,616 B2 * 4/2014 Fernandez Martinez ................... G06N 5/048
706/52
10,527,699 B1 * 1/2020 Cheng ................ G01R 33/5611
(Continued)

FOREIGN PATENT DOCUMENTS

KR     10-1867475     6/2018

OTHER PUBLICATIONS

Akcelik, V., Denli, H., Kanevsky, A., Patel, K.K., White, L. and Lacasse M.-D., "Multiparameter material model and source signature full waveform inversion", SEG Technical Program Expanded Abstracts, pp. 2406-2410, 2012.
(Continued)

*Primary Examiner* — Mohamed Charioui
(74) *Attorney, Agent, or Firm* — Lempia Summerfield Katz LLC

(57) ABSTRACT

A method and system of machine learning-augmented geophysical inversion includes obtaining measured data; obtaining prior subsurface data; (a) partially training a data autoencoder with the measured data to learn a fraction of data space representations and generate a data space encoder; (b) partially training a model autoencoder with the prior subsurface data to learn a fraction of model space representations and generate a model space decoder; (c) forming an augmented forward model with the model space decoder, the data space encoder, and a physics-based forward model; (d) solving an inversion problem with the augmented forward model to generate an inversion solution; and iteratively repeating (a)-(d) until convergence of the inversion solution, wherein, for each iteration: partially training the data and model autoencoders starts with learned weights from an immediately-previous iteration; and solving the inversion
(Continued)

problem starts with super parameters from the previous iteration.

25 Claims, 13 Drawing Sheets

(58) Field of Classification Search
CPC ......... G01V 2210/665; G01V 2210/66; G01V 2210/60; G01V 2210/667; G01V 2200/14; G01V 1/282; G01V 1/28; G06N 3/0454; G06N 3/04; G06N 3/02; G06N 3/00; G06N 3/08
See application file for complete search history.

(56) References Cited

U.S. PATENT DOCUMENTS

| | | | |
|---|---|---|---|
| 10,572,800 B2* | 2/2020 | Wang | G06N 3/04 |
| 2019/0064378 A1* | 2/2019 | Liu | G06N 3/0454 |

OTHER PUBLICATIONS

Backus, G.E. and Gilbert, J. F., "Numerical applications of a formalism for geophysical inverse problems", vol. 13, Geophysical Journal of the Royal Astronomical Society, pp. 247-276, 1967.
Chave A. D., and Jones, A. G., "The magnetotelluric method: theory and practice", pp. 1-7, Cambridge University Press, 2012.
Denli, H., Akcelik, V., Kanevsky A., Trenev D., White L. and Lacasse, M.-D., "Full-wavefield inversion for acoustic wave velocity and attenuation", SEG Technical Program Expanded Abstracts, pp. 980-985, 2013.
Duchi, J., Hazan, E. and Singer, Y., "Adaptive subgradient methods for online learning and stochastic optimization", Journal of Machine Learning Research, 12, pp. 2121-2159, 2011.
Etgen, J.T. and Michelena, R.J., "Introduction to this special section: Reverse time migration" The Leading Edge, vol. 29(11), pp. 1363-1363, 2009.
Goodfellow, I. J., Abadie, J., P., Mirza, M., Xu, B., Farley, D., W., Ozair, S., Courville, A., Bengio, Y., "Generative Adversarial Networks", Machine Learning, arXiv, 2014.
He, K., Zhang, X., Ren, S. and Sun, J., "Deep residual learning for image recognition", 2016 IEEE Conference on Computer Vision and Pattern Recognition, 2016.
Janoos, F., Denli H. and Subrahmanya N., "Multi-scale graphical models for spatio-temporal processes", Advances in Neural Information Processing Systems, 27, pp. 316-324, 2014.
Van Der Baan, M., Jutten, C., "Neural networks in geophysical applications", Geophysics, 65(4), pp. 1032-1047, 2000.
Kingma, P. D., and Ba, J., "Adam: A Method for Stochastic Optimization", ICLR, arXiv, 2015.
Hesthaven, J. S. and Warburton, T., "Nodal Discontinuous Galerkin Methods: Algorithms, Analysis, and Applications", pp. 19-39, Springer, Texts in Applied Mathematics, 2007.
Komatitsch, D. and Tromp, J. "The spectral element method for three-dimensional seismic wave propagation", SEG Technical Program Expanded Abstracts, pp. 2197-2200, 2000.
Leveque, R. J., "Finite volume methods for hyperbolic problems", pp. 64-85, Cambridge Texts in Applied Mathematics, Cambridge University Press, 2002.
Calderon-Macias, C., Sen, M. K. and Stoffa, P. L., "Artificial neural networks for parameter estimation in geophysics", Geophysical Prospecting, 48, pp. 21-47, 2000.
Moczo, P., Robertsson, J. O. A. and Eisner, L., "The finite-difference time-domain method for modeling of seismic wave propagation", Advances in Wave Propagation in Heterogeneous Earth, Advances in Geophysics, pp. 421-516. Elsevier, 2007.
Oldenburg, D., "Inversion of electromagnetic data: An overview of new techniques", Surveys in Geophysics, 11(2), pp. 231-270, 1990.

Roth, G. and Tarantola, A., "Neural networks and inversion of seismic data", Journal of Geophysical Research, 99, pp. 6753-6768, 1994.
Schiesser, W. E., "The numerical method of lines", Academic Press, 1991.
Srivastava, N., Hinton, G., Krizhevsky, A., Sutskever, I. and Salakhutdinov, R., "Dropout: A simple way to prevent neural networks from overfilling", Journal of Machine Learning Research 15, pp. 1929-1958, 2014.
Virieux, J. and Operto, S. "An overview of full-waveform inversion in exploration geophysics", Geophysics, 74(6), pp. WCC1-WCC26, 2009.
Sava, P. and Hill, S. J., "Overview and classification of wavefield seismic imaging methods" The Leading Edge, vol. 28(2), pp. 170-183, 2009.
Aster, R.C., Borchers, B., and Thurber, C.H., "Chapter 4: Tikhonov Regularation," Parameter Estimation and Inverse Problems, pp. 93-115, Elsevier, 2013.
Li, Y. and Krahenbuhl, R., "Gravity and magnetic methods in mineral and oil & gas exploration and production", pp. 15-24, EAGE, 2015.
Nocedal, J. and Wright, S.J., "Numerical optimization", pp. 21-26, Springer Series in Operations Research and Financial Engineering. Springer, 2006.
Ronneberger, O., Fischer, P. and Brox, T., "U-Net: Convolutional Networks for Biomedical Image Segmentation", Medical Image Computing and Computer-Assisted Intervention (MICCAI), Springer, LNCS, vol. 9351: pp. 234-241, 2015.
Tarantola, A., "Inverse problem theory and methods for model parameter estimation", pp. 57-64, SIAM, 2005.
Yilmaz, O., "Seismic data analysis: Processing, inversion, and interpretation of seismic data", pp. 463-476, Investigations in Geophysics, Society of Exploration Geophysicists, 2001.
Ma, Y., Hale D., Gong B. and Meng, Z., "Image-guided sparse-model full waveform inversion", Geophysics, 77(4), pp. 189-198, 2012.
Kingma, D.P. and Welling, M., "Auto-encoding variational Bayes", Proceedings of The International Conference on Learning Representations, 2014.
Goodfellow, I., Pouget-Abadie, J., Mirza, M., Xu, B., Warde-Farley, D., Ozair, S., Courville, A. and Bengio, Y., "Generative adversarial nets", Advances in Neural Information Processing Systems, 2672-2680, 2014.
Richardson, A., "Seismic full-waveform inversion using deep learning tools and techniques", arXiv:1801.07232v2, Jan. 31, 2018.
Lewis W. and Vigh, D., "Deep learning prior models from seismic images for full-waveform inversion", SEG Technical Program Expanded Abstracts, pp. 1512-1517, 2017.
Partyka, G., "Seismic processing and analysis in service of interpretation", SEG Technical Program Expanded Abstracts, pp. 5261-5266, 2017.
Wang, B., Kim, Y., Mason, C. and Zeng, X., "Advances in velocity model-building technology for subsalt imaging", Geophysics, 73(5), pp. VE173-VE181, 2008.
Etgen, J., Gray, S. H. and Zhang, Y., "An overview of depth imaging in exploration geophysics", Geophysics, 74(6), pp. WCA5-WCA17, 2009.
Lines, L. R. and Newrick, R. T., "Fundamentals of Geophysical Interpretation", Chapters 15-18, Geophysical Monograph Series, Society of Exploration Geophysicists, pp. 137-180, 2004.
Poulton, M. M., "Computational neural networks for geophysical data processing", Handbook of Geophysical Exploration, 2001, Chapters 7 (p. 116) and 12 (pp. 187-215).
Mandelli, Sarah et al., "Seismic data interpolation through convolutional autoencoder," SEG Technical Program Expanded Abstracts, Aug. 27, 2018, pp. 4101-4105.
Alumbaugh, David et al., "Ensemble-based seismic history matching with data reparameterization using convolutional autoencoder," SEG Technical Program Expanded Abstracts, Aug. 27, 2018, pp. 3156-3160.

* cited by examiner

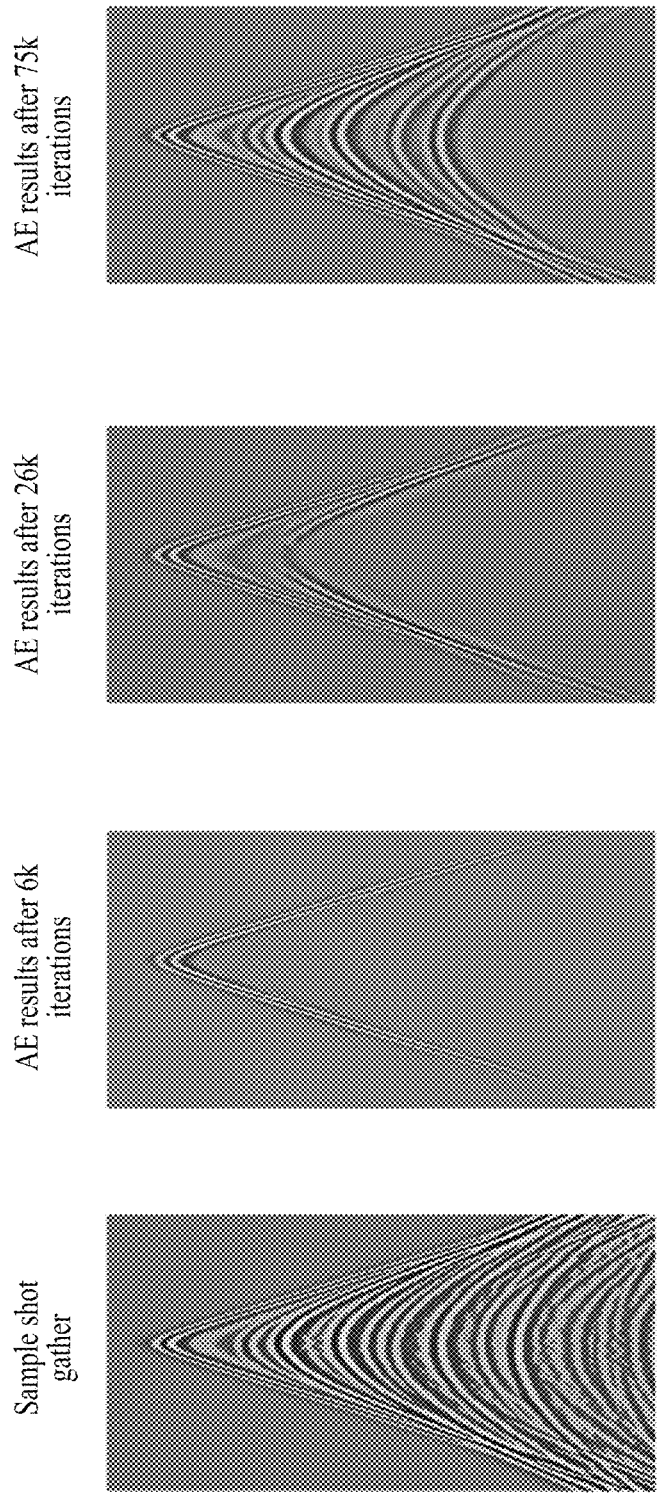

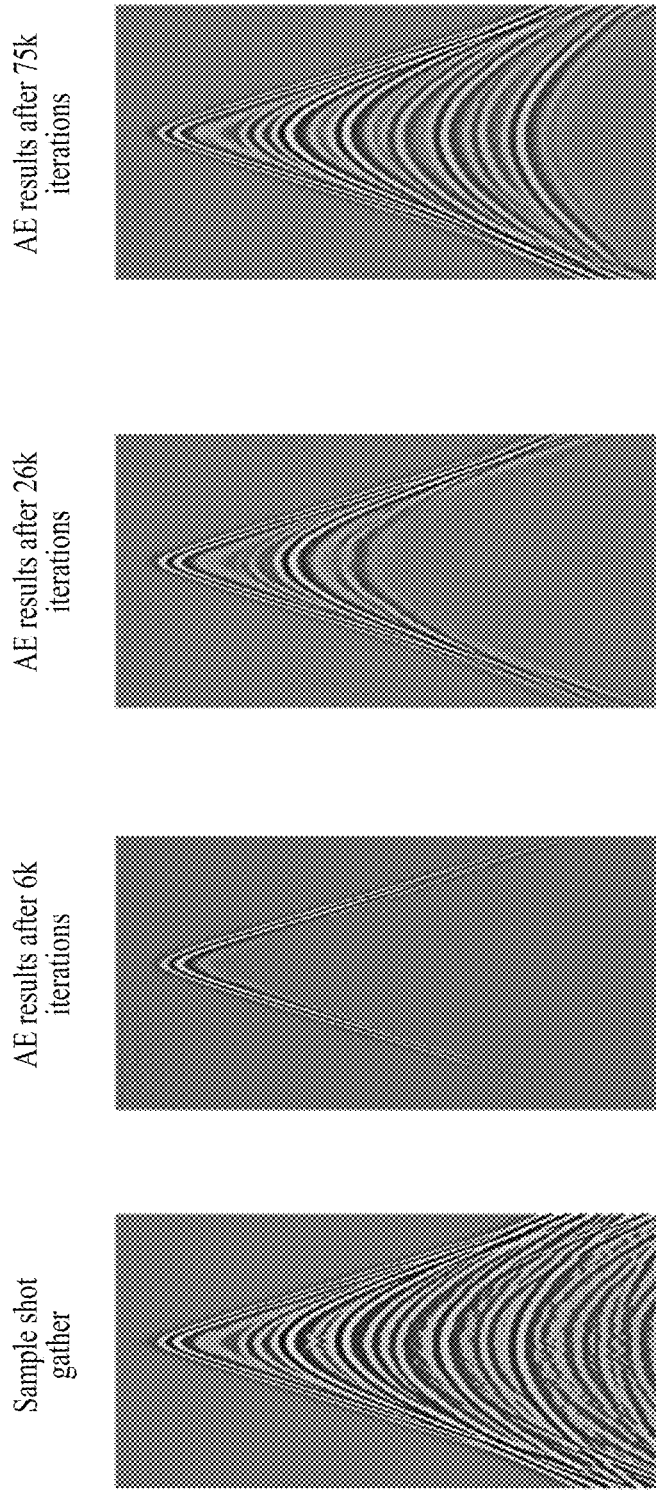

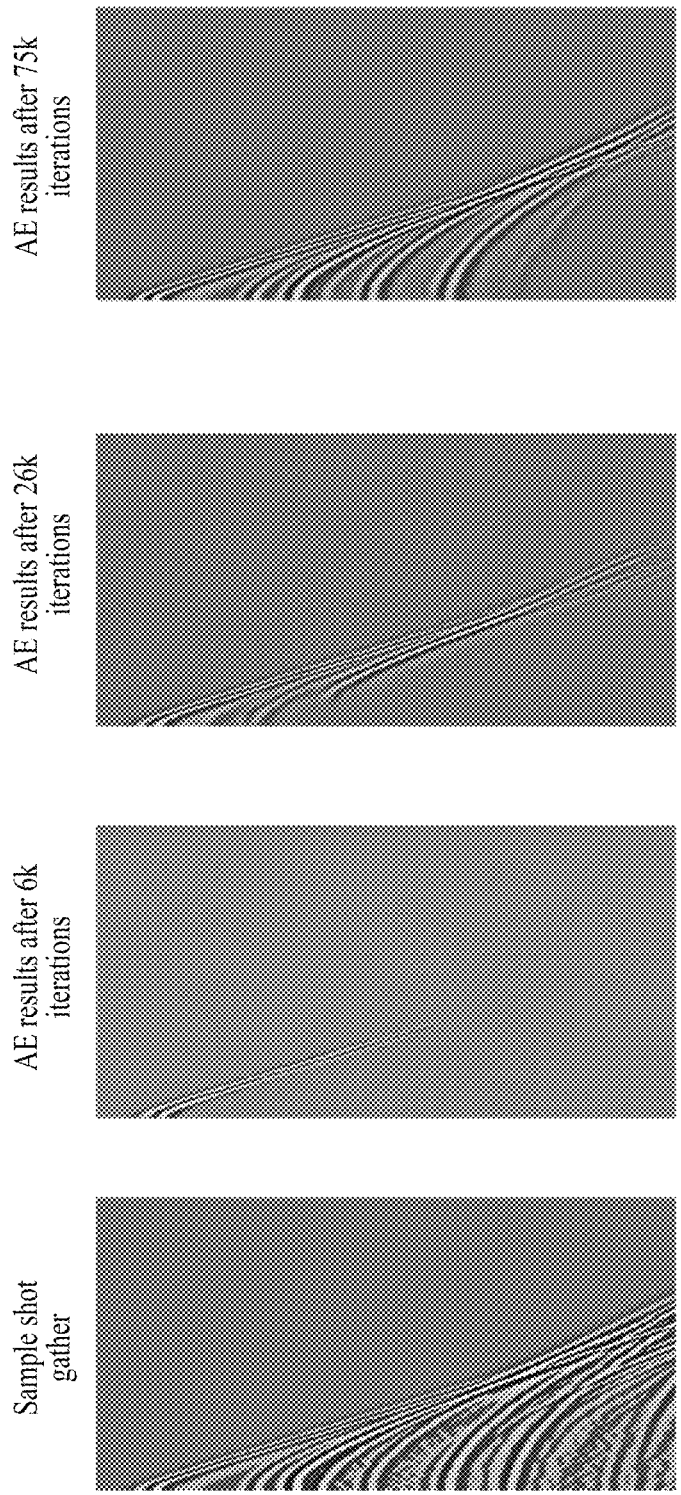

MACHINE LEARNING-AUGMENTED GEOPHYSICAL INVERSION

CROSS-REFERENCE TO RELATED APPLICATIONS

This application claims the benefit of U.S. Provisional Application Ser. No. 62/777,872, filed Dec. 11, 2018, the disclosure of which is herein incorporated by reference in its entirety.

FIELD

This disclosure relates generally to the field of geophysical prospecting and, more particularly, to seismic prospecting for hydrocarbon management and related data processing. Specifically, exemplary embodiments relate to methods and apparatus for improving computational efficiency and accuracy by using machine learning to augment inversion analysis.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface geologic structures (e.g., stratigraphic layers, sedimentary layers, salt domes or bodies, carbonate build-ups, channel systems, faults, shale diapirs, hydrocarbon accumulations, etc.). For example, seismic data may be gathered and processed to generate subsurface models that reveal geologic structure. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, one or more inversion procedures may be utilized to analyze the geophysical data and produce models of rock properties and/or fluid properties. Generally, inversion is a procedure that finds a parameter model, or collection of models, which, through simulation of some physical response to those parameters, can reproduce to a chosen degree of fidelity a set of measured data. Inversion procedures typically iteratively compare the simulated data to measured data until the results converge. For example an objective function may be optimized to seek the convergence. Inversion may be performed, for example, on seismic data to derive a model of the distribution of elastic-wave velocities within the subsurface of the earth. For example, Full Wavefield Inversion (FWI) simulates seismic waves as induced in the field, and attempts to match the measured seismic response. FWI tends to be a very challenging computational problem because the amount of data to be simulated is large (comprising a full 3D seismic acquisition), and simulated seismic waves are sensitive to not only a large volume of the earth, but to relatively fine-scale variations in properties within that volume. Therefore, naive parameterization of a subsurface model (e.g., by uniform discretization) may require many volume elements (voxels) of uniform elastic velocities to match simulated data to the observed seismic data.

Geophysical parameter models built using FWI may be inaccurate and inefficient due to a number of reasons, including non-uniqueness (which may lead to solutions that do not make geologic sense in light of the data), lack of convexity in the objective function, and computational costs. Non-uniqueness is a pervasive characteristic of geophysical inversion. Non-uniqueness may be particularly pronounced when inverting for multiple geophysical parameters simultaneously (e.g. multi-parameter FWI). Seismic surveys typically acquire data at locations remote from the subsurface region of interest and at narrow frequency bands due to the physical limitations of surveying equipment. These limitations lead to incomplete information, inadequate resolution, and large uncertainty about the subsurface region of interest. While additional data, such as the geological knowledge of seismic interpretation experts, could mitigate non-uniqueness, current methods do not typically offer a framework of incorporating seismic interpretation knowledge into inversion procedures.

Alternatively, the subsurface parameter space may be reparametrized so that the inversion problem is well-posed with a unique solution. However, current FWI formulations are based on a discretization method, such as finite differences. Thus, the discretization method dictates the model space representation, which is uniform regardless of geological expectations.

Also, the large-scale nature of the geophysical inversion problems precludes the use of global optimization techniques, dictating instead the use of local-gradient-based techniques. The objective function of a geophysical inversion problem may not be convex due to the oscillatory nature of the measured seismic signal. Gradient-based optimization methods applied to a non-convex objective functional may be sensitive to the initial subsurface physical property model. If the initial model of an inversion is not in a convex neighborhood of the global minimum, the gradient-based optimization methods tend to converge to an undesired local minimum. This issue becomes more pronounced when large geologic structures, such as salt formations, exist in the subsurface region: velocity anomalies (indicative of subsurface structures) with complex shapes and/or high-contrast, sharp boundaries may severely distort seismic waves and/or scatter seismic energy.

Also, state-of-the-art objective functionals (e.g. phase-only, Weiner filter, envelope and cross-correlation) typically compare simulated data to measured data time-sample by time-sample, without making use of the already existing structures in the data spaces. Such procedures typically involve a seismologist or geophysicist to analyze and intuitively recognize such structures (e.g. arrivals from the top of a salt dome) by noting that these structures in data tend to correspond to certain geophysical features of the subsurface (e.g. top of the salt dome). In other cases, information traveling through a subsurface region may be weighted in the objective functional to be identifiable. In some instances, information in the seismic data is convoluted with additional waves, such as head waves, reflections, multiples, refractions, and prism waves. A generic mathematical objective functional makes it difficult for FWI to sort out the information, leading to additional lack of convexity in the objective function and/or under-representation of important information (e.g. seismic events coming from the bottom of the salt or class 2P Direct Hydrocarbon Indicators (DHIs), etc.). Additionally, all these different types of waves are sensitive to different features of the subsurface. Solutions in model space may be characteristically different and potentially low-dimensional (e.g. diving waves are sensitive to background velocity while reflections are sensitive to facies boundaries).

More efficient equipment and techniques to generate more accurate subsurface models would be beneficial.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 6A illustrates exemplary shot gather fields. FIGS. 6B-6D illustrate exemplary constructed shot gather fields from an autoencoder based on the shot gather fields of FIG. 6A.

FIG. 7A illustrates the exemplary shot gather fields from FIG. 6A. FIGS. 7B-7D illustrate exemplary constructed shot gather fields from another autoencoder based on the shot gather fields of FIG. 7A.

FIG. 8A illustrates other exemplary shot gather fields. FIGS. 8B-8D illustrate exemplary constructed shot gather fields from yet another autoencoder based on the shot gather fields of FIG. 8A.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data or properties, including geophysical parameters such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

Figure 1:
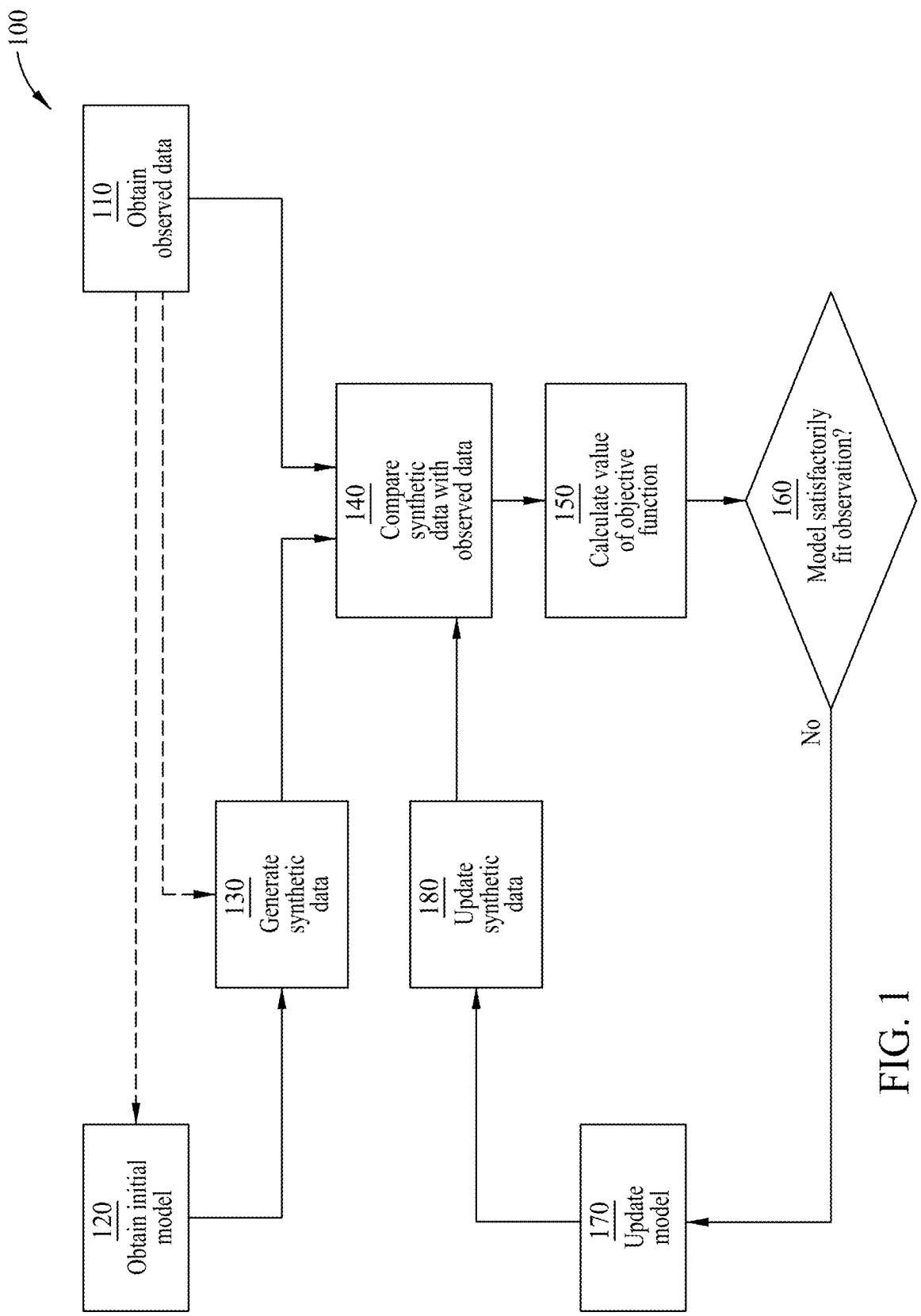
FIG. 1 illustrates an exemplary Full Wavefield inversion method according to embodiments disclosed herein.

As used herein, inversion in general, and more specifically Full Wavefield Inversion ("FWI"), refer to geophysical methods which are used to estimate subsurface properties (such as velocity or density). FWI is known to be advanced for the higher resolution and more accurate physics compared to other methods. The fundamental components are illustrated in FIG. 1. A FWI method 100 can be described as follows: observed data (e.g., field seismic measurements) is obtained at block 110. An initial model (e.g., a starting subsurface physical properties model) is obtained at block 120. In some embodiments, the initial model may be informed by the observed data. Using the initial model, synthetic data (e.g., seismic data) is generated at block 130, for example by solving a wave equation (e.g., acoustic or elastic wave equation) and/or using a numerical scheme (e.g., finite-difference, finite-element etc.). In some embodiments, the observed data may be used to generate the synthetic data. Generating the synthetic data may sometimes be referred to as "forward modeling." For example, a physics-based forward model may connect the model to the observed data in discretized spaces. Next, the synthetic data are compared with the observed data at block 140. Using the differences between the synthetic data and the observed data, the value of an objective function is calculated at block 150. The value of the objective function is checked at block 160 to determine whether the model satisfactorily fits the observations. If not, the model is updated at block 170. For example, to optimize the objective function, a modified subsurface model is generated. The synthetic data is updated at block 180. For example, the modified subsurface model may be used to simulate a new set of synthetic seismic data. This new set of synthetic seismic data is compared with the observed data (at block 140) to recalculate the value of the objective function (at block 150). This objective function optimization procedure is iterated by using the new updated model as the starting model for finding another search direction, which will then be used to perturb the model in order to better explain the observed data. The process continues until an updated model is found that satisfactorily explains the observed data (at block 160). A global or local optimization method can be used to minimize the objective function and to update the subsurface model. Commonly used local objective function optimization methods include, but are not limited to, gradient search, conjugate gradients, quasi-Newton, Gauss-Newton, and Newton's method. Commonly used global methods included, but are not limited to, Monte Carlo or grid search. Inversion may also refer to joint inversion with multiple types of data used in conjunction.

FWI exploits a full seismic record including events that are treated as "noise" by standard seismic-processing algorithms. FWI is typically carried out through an iterative minimization of an objective function consisting of a norm data misfit and a regularization term:

$$\mathcal{F}(\kappa) = 1/2 \Sigma_s^{N_s} \Sigma_r^{N_r} \int_{t_0}^{t_f} \|u(\kappa; x_s, x_r, t) - u^*(x_s, x_r, t)\|^2 dt + R(\kappa) \tag{1}$$

where $\kappa(x)$ represents unknown values of geophysical parameters (e.g., compressional velocity, shear velocity, anisotropy, attenuation, and/or source temporal signature) distributed across the subsurface region. Equation (1) seeks to determine values for $\kappa(x)$ through minimization/optimization. In addition, x is the spatial coordinate system, $N_s$ and $N_r$ are the numbers of sources and receivers respectively, t is time, $t_0$ is the time at which the source s is actuated and/or the recording is started, $t_f$ is the final recording time, $u^*(x_s, x_r, t)$ is the measurement at the receiver location $x_r$ due to source s located at $x_s$ at time t, $u(\kappa; x_s, x_r, t)$ is the data at the receiver location $x_r$ due to source s located at $x_s$ at time t computed according to a mathematical model, $R(\kappa)$ is a regularization term used to mitigate the mathematical non-uniqueness of the inversion problem (e.g., Tikhonov or total-variation regularization).

Although the physical parameter $\kappa$ is a spatially varying function defined at every point of a subsurface domain $\Omega$, $\kappa$ is typically discretized for computational purposes when optimizing the objective function $\mathcal{F}(\kappa)$. For example, conventional (or cell-based, or voxel-based) FWI may first partition the subsurface domain $\Omega$ into disjoint cells $\Omega_i$ (e.g., along a regular Cartesian grid), and then set $\kappa(x) = \kappa_i$ for $x \in \Omega_i$. Conventional FWI may then determine the parameter values $\{\kappa_i\}$ by optimizing Equation (1), typically using a gradient-based optimization technique, such as Gauss-Newton, quasi-Newton, or steepest descent.

The mathematical model, also known as a forward problem, used to compute $u(\kappa; x_s, x_r, t)$ describes the physics of seismic waves propagating in the subsurface. Depending on the assumptions made about the subsurface medium, the governing equations for simulating seismic waves can be acoustic, elastic, or acoustic-coupled-elastic wave equations. In some cases, the forward problem may also describe anisotropy and/or attenuation. For example, anisotropy may be due to materials or features with response below seismic wavelengths, such as fine rock layers and fractures. Seismic attenuation may be due to the loss of energy in the wavefield due to conversion into other forms, such as heat and fluid motion. While this disclosure describes acoustic waves for simplicity, this should not limit the scope of the disclosure.

The acoustic pressure u of a bounded medium may be described by wave equations:

$$\frac{1}{\kappa} \frac{\partial^2 u}{\partial t^2} = \nabla \cdot \left( \frac{1}{\rho} \nabla u \right) - \frac{f}{\rho} \delta(x - x_s), \tag{2.1}$$

$$u = \frac{\partial u}{\partial t} = 0 \text{ at } t = 0, \tag{2.2}$$

$$u = 0 \text{ on } \partial \Omega_{free} \times [0, t_f], \tag{2.3}$$

$$\sqrt{\frac{\rho}{\kappa}} \frac{\partial u}{\partial t} + n \cdot \nabla u = 0 \text{ on } \partial \Omega_{absorbing} \times [0, t_f]. \tag{2.4}$$

where $\nabla$ is the spatial gradient operator, $\rho$ is the mass density, and $\kappa$ is the bulk modulus which is a function of compressional velocity $v_p$ and density $\rho$ as $\kappa = \rho v^2$. A homogeneous mass density may be assumed: $\rho = 1$ g/cm$^3$. In addition, $\partial \Omega_{free}$ and $\partial \Omega_{absorbing}$ are the free and absorbing boundaries, and n is the unit vector normal to $\Gamma_{absorbing}$. Typically, $\partial \Omega_{free}$ represents the Earth's surface (i.e. the air-water interface in marine environments, or the air-solid interface on land environments) due to the approximately stress-free state at the interface. The remaining boundaries of the computational domain typically belong to $\partial \Omega_{absorbing}$. The boundary conditions are designed to prevent spurious reflected waves due to truncation of the physical domain. Finally, it is assumed that the source is fired at location $x_s$, $f(t)\delta(x - x_s)$, and is a spherically symmetric pressure source with a source temporal signature f(t), such as a Ricker wavelet. A variety of numerical techniques exist for solving an acoustic wave equation, such as Equations (2.1)-(2.4), including discretization and integration with a time-stepping scheme, and/or hyperbolic partial differential equation solutions using recurrent convolutional neural networks.

The terms "velocity model," "density model," "physical property model," or other similar terms as used herein refer to a numerical representation of parameters for subsurface regions. Generally, the numerical representation includes an array of numbers, typically a 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A geologic model may be represented in volume elements (voxels), in a similar way that a photograph is represented by picture elements (pixels). As discussed below, in some embodiments, such numerical representations may be shape-based or functional forms in addition to, or in lieu of, cell-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing and/or adapting prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint, while a common shot gather contains traces having a common shot.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is enhanced automation of procedures for generating subsurface models. Such automation may accelerate the generation of subsurface models, reduce subjective bias or error, and reduce the geoscience workforce's exposure to ergonomic health risks (e.g., exposure to repetitive tasks and injuries therefrom). Another potential advantage includes converting geologic rules, concepts, patterns, and experience into finite computer code. Another potential advantage includes providing a unified mathematical framework by which both physics-based data constraints and geologic concepts are satisfied by a single procedure. Another potential advantage includes improvement in speed, objectivity, and accuracy of the seismic analysis process. For example, by speeding up the search for valid models (e.g., during FWI), embodiments may enable the discovery of multiple data-consistent and geologically reasonable models. Another potential advantage includes using unsupervised machine learning (e.g. autoencoders and/or generative-adversarial networks) to learn meaningful representation(s) of data space and/or model spaces. Such representation(s) may reduce the number of parameters utilized to describe the subsurface models and data, while still preserving salient features. Another potential advantage includes formulating an objective function in a lower-dimensional space, allowing the inversion to meaningfully compare computer-generated data with measurements. For example, rather than an amplitude-based comparison (e.g., least-squares methods), the comparison may be focused on events that occur at the same time (e.g. similar to how a seismologist/geophysicist would compare them). Embodiments of the present disclosure can thereby be useful in the discovery and/or extraction of hydrocarbons from subsurface formations.

An exemplary embodiment teaches an inversion method (e.g., seismic full-wavefield inversion) that is augmented with a machine learning approach to better determine accurate and robust subsurface models that are consistent with seismic measurements as well as geologic expectations (e.g. model space representations of structural components such as sedimentary layers, faults and salt domes) and seismic data representations (e.g. data space representations of acoustic waves, elastic waves, acoustic-coupled-elastic waves). Geologic expectations may be learned using unsupervised training processes from examples of plausible prior subsurface data (images, interpretations, and/or geophysical models), as well as well logs. The learned geologic expectations may be incorporated into FWI to mitigate its non-uniqueness. The seismic data representations may be learned from the seismic shot records using unsupervised training processes. The learned representations may then be incorporated into the FWI objective functionals in order to measure the geophysical data conformance and to mitigate FWI sensitivity to starting models. In some embodiments, machine learning may be used to augment geophysical inversion (e.g., partial differential equation-constrained optimization such as FWI) to overcome the technical challenges of conventional geophysical inversion. For example, the technical challenges of non-uniqueness and general-purpose mathematical objective measures (e.g. least squares) are due to the way that FWI objective functionals are formulated (e.g., comparing computer simulation data with measurements time-sample by time-sample (or pixel by pixel)). Methods disclosed herein may learn to map from discretized data space u (e.g. represented time-sample by time-sample) to a super attribute space $\bar{u}$, which may be a lower-dimensional space compared to u. This mapping ($\bar{u}=\phi_\varepsilon(u)$) and its pseudo-inverse mapping $u=\phi_D(\bar{u})$) may be learned from seismic shot records $u^*$ using an unsupervised learning algorithm such as autoencoders (AE), variational autoencoders (VAE), generative-adversarial networks (GAN), or a combined VAE and GAN (VAEGAN). Similarly, a mapping for the model space $\kappa$ may be learned from the available samples of the prior subsurface data (e.g., images in a discretized space (represented by pixels or cells), analog images, and well logs). This model space mapping ($\bar{\kappa}=\psi_\varepsilon(\kappa)$ and its pseudo-inverse mapping $\kappa=\psi_D(\bar{\kappa})$) may be from a discretized model space $\kappa$ to a super parameter space $\bar{\kappa}$ (also referred to as latent space or feature space). The FWI objective functional in these new spaces may be formulated as:

$$\mathcal{F}(\bar{\kappa}) = \frac{1}{2}\sum_s^{N_s} \|\phi_E(u(\psi_D(\bar{\kappa}); x_s, x_r, t)) - \phi_E(u^*(x_s, x_r, t))\|^2 + \qquad (3)$$

$$R_{\bar{\kappa}}(\bar{\kappa}) + R_\kappa(\psi_D(\bar{\kappa}))$$

where $R_{\bar{\kappa}}$ and $R_\kappa$ are the regularization terms in the super attribute space $\bar{\kappa}$ and the discretized space $\kappa$, respectively.

Figure 2A:
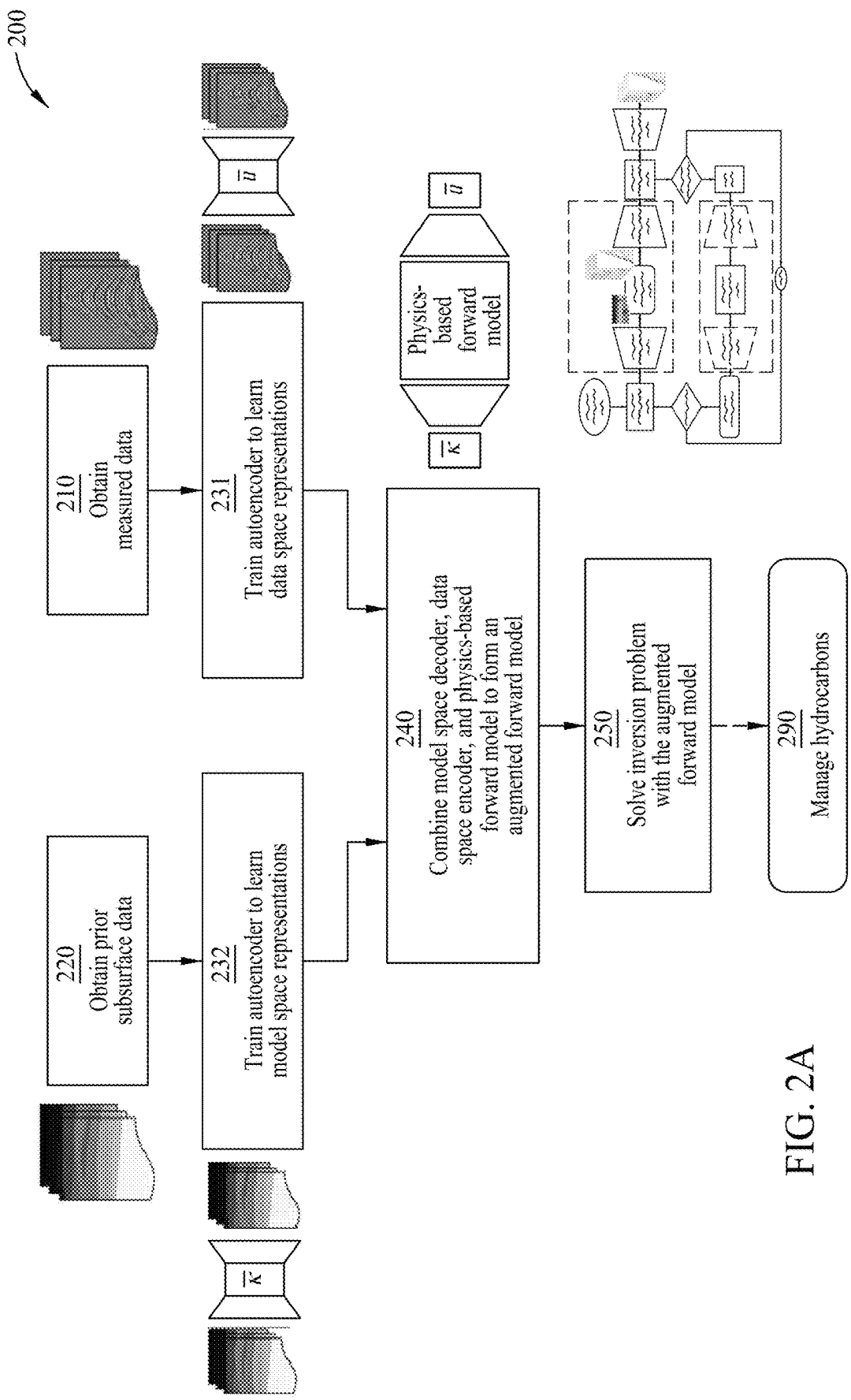
FIG. 2A illustrates an exemplary method of machine learning-augmented geophysical inversion.

FIG. 2A illustrates an exemplary method 200 of machine learning-augmented geophysical inversion. Method 200 begins at blocks 210 and 220 (which may proceed in any order or concurrently). At block 210, measured data (e.g., seismic measurements) is obtained. In some embodiments, the measured data may be newly acquired, for example by a geophysical survey. In some embodiments, the measured data may be obtained from a data library (e.g., a library of data from previous geophysical surveys). In some embodiments, the measured data may be synthetic data generated by simulations based on a set of plausible subsurface regions. In some embodiments, the measured data may include portions from any or all of these data sources. Prior subsurface data (e.g., subsurface geophysical models, analog subsurface geophysical models, subsurface images, analog subsurface images, well logs, etc.) is obtained at block 220. For example, the prior subsurface data may be estimates of values of geophysical properties (e.g., compressional velocity, shear velocity, density, anisotropy, or porosity) as a function of depth in the subsurface region. In some embodiments, the prior subsurface data may be a collection of subsurface models from a subsurface library and constructed previously for the same basin where the current geophysical inversion is performed, or a collection of subsurface geophysical models from a subsurface library and constructed for an analog basin where similar subsurface features are expected to exist. The prior subsurface data may be obtained from a data library or previous analysis of the subsurface region or geological basin. The prior subsurface data may be a voxelized or cell-based model space representation of the subsurface region. Using the measured data (from block 210), an autoencoder is trained to learn data space representations at block 231. Using the prior subsurface data (from block 220), an autoencoder is trained to learn model space representations at block 232. Method 200 proceeds at block 240 where the trained model space decoder and the trained data space encoder are combined with a physics-based forward model (e.g. wave simulator) to form an augmented forward model. For example, the augmented forward model may be configured to use a set of super parameters as input, and the augmented forward model may be configured to generate values of super attributes as output. In some embodiments, the augmented forward model may run the trained model decoder to expand super parameter inputs to cell-based values (e.g., the physics-based forward model inputs). The augmented forward model may be configured to run the physics-based forward model to generate geophysical data based on the expanded super parameters. The augmented forward model may be configured to use the trained data encoder to contract the geophysical data (e.g., physics-based forward model output) to the values of the super attributes. Method 200 proceeds at block 250 to solve an inversion problem with the augmented forward model (from block 240). For example, a partial differential equation-constrained optimization method may be used to solve this inversion problem. FIG. 2C illustrates an exemplary optimization method 251 that could be used at block 250 to solve the inversion problem. In some embodiments, solving the inversion problem generates proposed subsurface geophysical models and/or images thereof. In some embodiments, method 200 proceeds at block 290 where the results of solving the inversion problem (e.g., the proposed subsurface geophysical models and/or images thereof) are utilized to manage hydrocarbons.

Figure 2B:
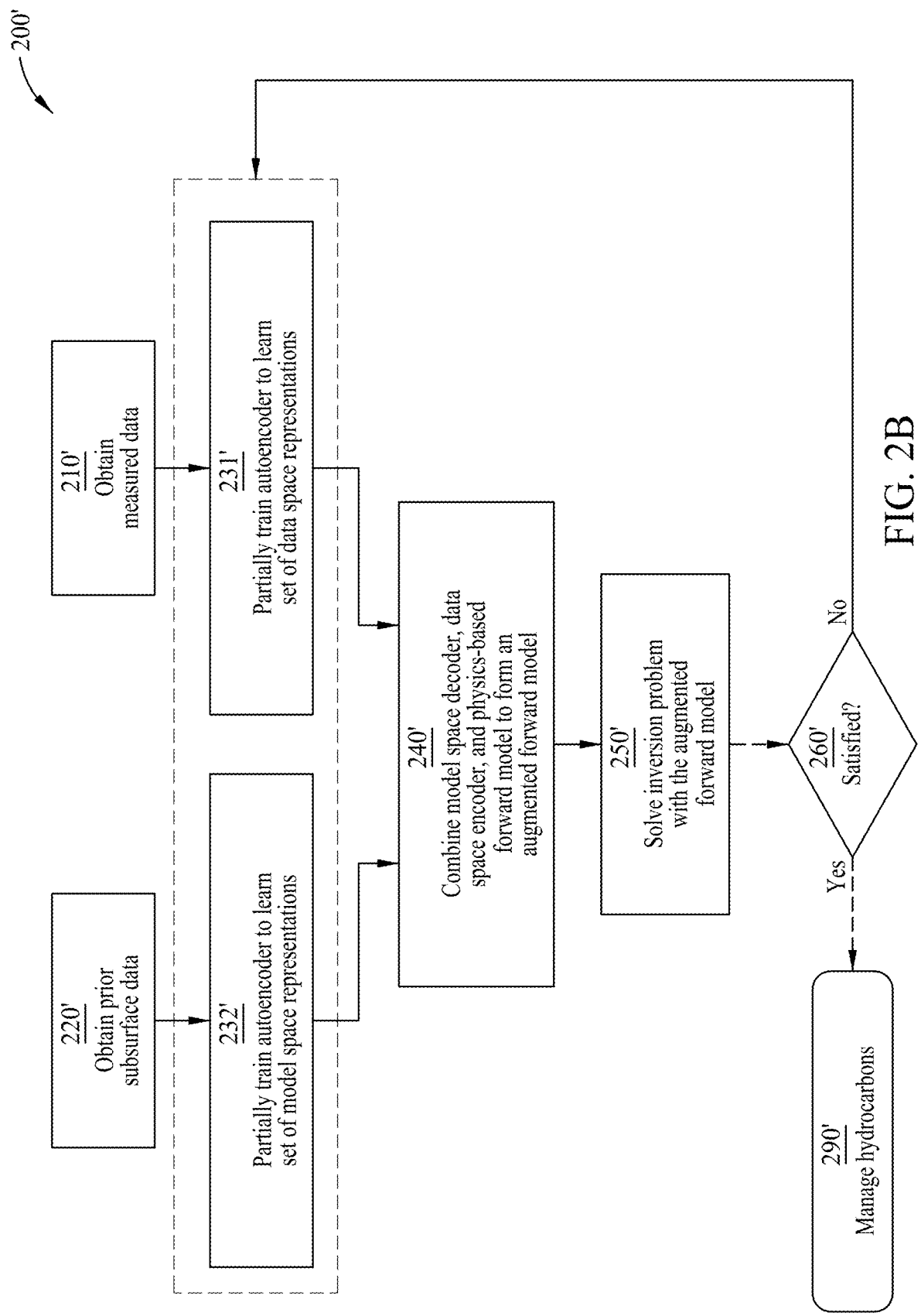
FIG. 2B illustrates another exemplary method of machine learning-augmented geophysical inversion.
Figure 2C:
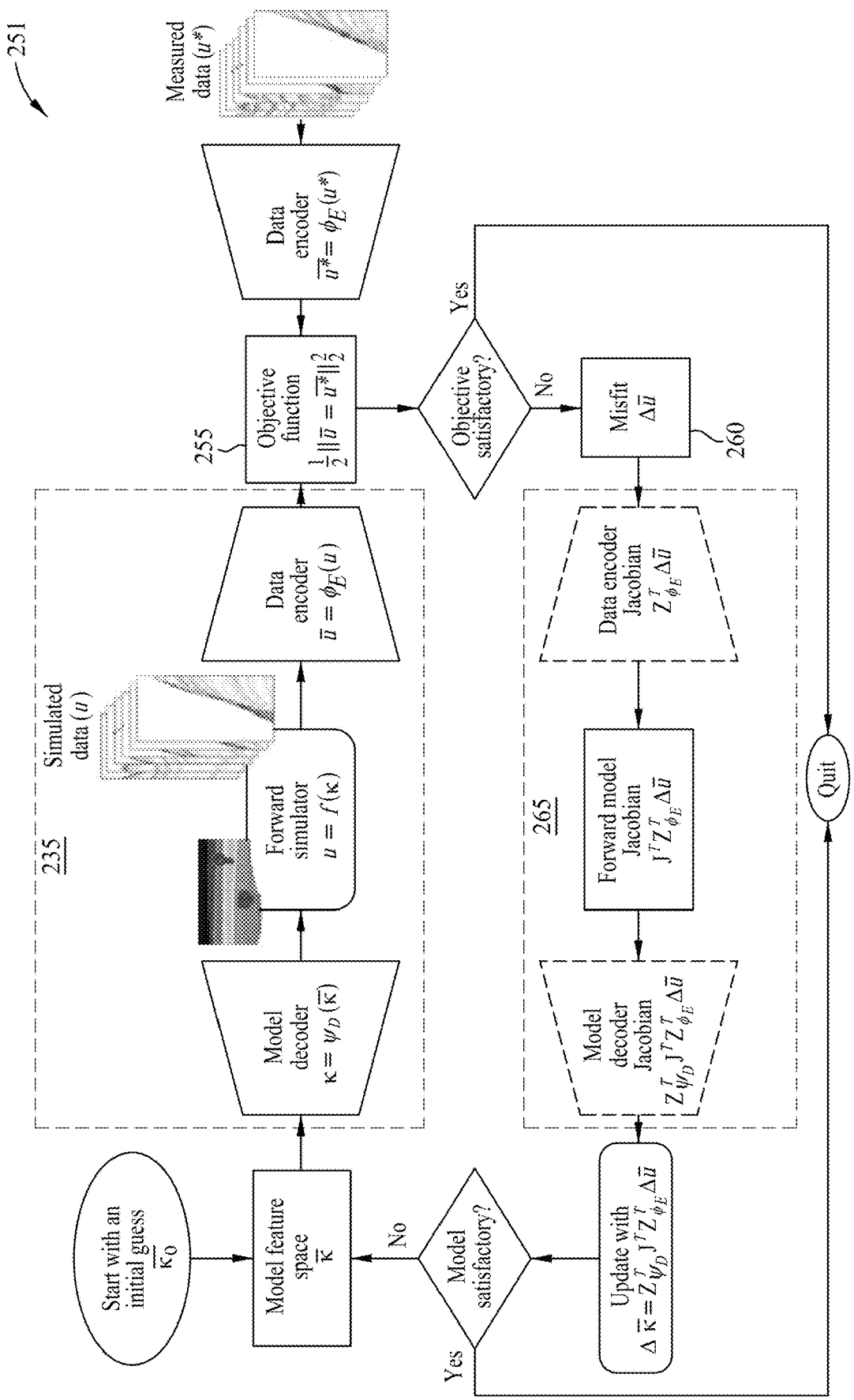
FIG. 2C illustrates an exemplary optimization method that could be used to solve the inversion problems of FIG. 2A or 2B.

FIG. 2B illustrates another exemplary method 200' of machine learning-augmented geophysical inversion. Method 200' begins at blocks 210' and 220' (which may proceed in any order or concurrently). At block 210', measured data (e.g., seismic measurements) is obtained. Prior subsurface data (e.g., subsurface geophysical models, analog subsurface geophysical models, subsurface images, analog subsurface images, well logs, etc.) is obtained at block 220'. Using the measured data (from block 210'), an autoencoder is partially trained for learning a set of data space representations at block 231'. Using the prior subsurface data (from block 220'), an autoencoder is partially trained for learning a set of model space representations at block 232'. In some embodiments, the autoencoder training (at blocks 231' and 232') comprises minimizing a loss functional (e.g. cross-entropy), typically using an iterative method. The partial training refers to taking iterations towards minimizing the loss functional, but terminating the process before it converges to a minimum. Unlike method 200, the autoencoder trainings of method 200' (at blocks 231' and 232') are carried out approximately by taking a limited number of iterations. For example, during the first iteration, the prior subsurface data (from block 220') may be used at block 232' to train the autoencoder for learning a particular fraction of the model space representations (e.g., only direct arrival events). During the second iteration, the prior subsurface data (from block 220') may be used at block 232' to train the autoencoder for learning another particular fraction of the model space representations (e.g., only primary reflection events), building upon the fraction learned during the first iteration. The second iteration autoencoder training may start from the state of the autoencoder from the end of the first iteration. The particular fraction learned during a particular iteration, along with all fractions learned during prior iterations, may then be used in the inversion problem at block 250' for that particular iteration. Thus, when the method 200' proceeds at block 240', where the model decoder and the data encoder are combined with the physics-based forward model to form an augmented forward model, the resultant augmented forward model can allow for inversion of a learned fraction of the data in the learned fraction of the model representations. Method 200' proceeds at block 250' to solve an inversion problem (similarly to solving the inversion problem in block 250 of FIG. 2A) with the augmented forward model (from block 240') based on the partially trained autoencoders (from blocks 231' and 232'). In some embodiments, at each iteration, solving the inversion problem generates proposed subsurface geophysical models and/or images thereof. In some embodiments, the inversion problem with the augmented forward model may be partially solved. Partially solving an inversion problem refers to taking iterations towards minimizing the inversion objective functional, but terminating the inversion process before it converges to a minimum (e.g., by taking a limited number of iterations). This process of iterative partial learning in tandem with iterative inversions may be repeated until convergence, as illustrated at decision block 260'. If convergence criteria are not satisfied at block 260', method 200' returns to blocks 231' and 232' (in any order), where the models and data autoencoders are iteratively trained to learn additional representations of the data and model spaces without forgetting the learned representations. This iterative training process may start from the learned parameters of the autoencoders from the previous iteration, and then take a number of additional iterations to learn additional representations of the data and model spaces. In some embodiments, once convergence criteria are satisfied, method 200' proceeds at block 290', where the results of solving the inversion problem (e.g., the proposed geophysical models and/or images thereof of the final iteration) are utilized to manage hydrocarbons.

FIG. 2C illustrates an exemplary optimization method 251 that could be used at blocks 250 or 250' to solve the inversion problem. For example, method 251 may be used to solve the optimization problem described by the objective functional of Equation (3). Method 251 may use an extracted decoding/generator network to parameterize the solution space of the wave equations of Equation (2). Moreover, method 251 may use gradient-based and/or global optimization methods for solving Equation (3) in the latent low-dimensional model space. In some embodiments, method 251 augments FWI method 100. For example, similar to method 100, a physics-based forward model is used to generate simulated data u at block 235. Likewise, the measured data a and the simulated data u are compared using an objective function 255, and a misfit $\Delta\bar{u}$ is calculated and checked at block 260. In some embodiments, objective function 255 may be expressed in super attribute space, rather than sample-by-sample data space, thereby mitigating local minima concerns.

Figure 3A:
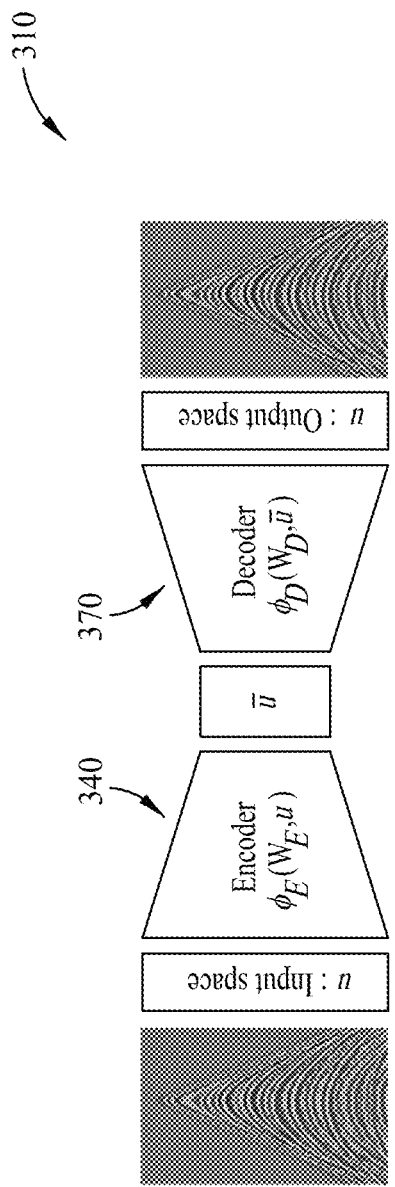
FIG. 3A illustrates an exemplary autoencoder model for learning data-space representations.
Figure 3B:
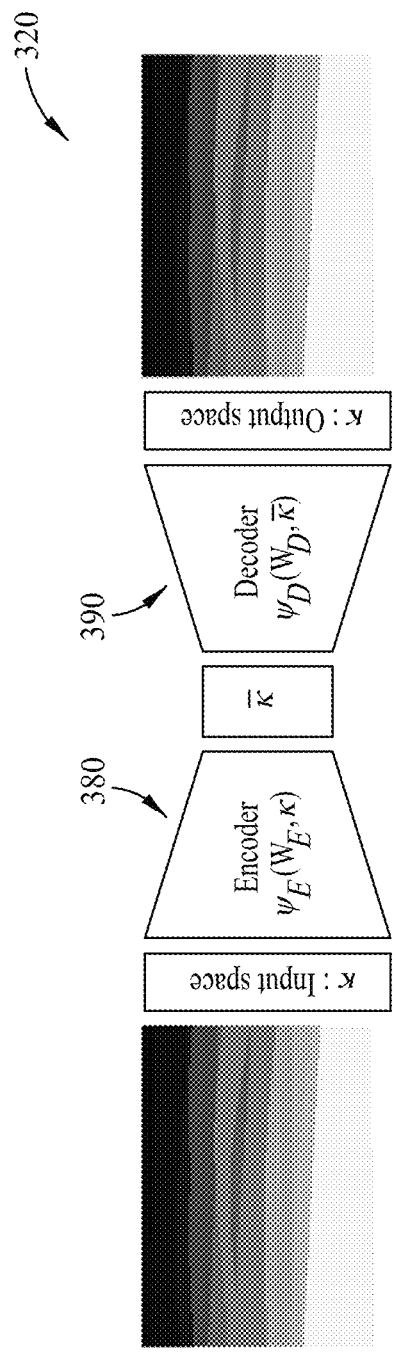
FIG. 3B illustrates another exemplary autoencoder model for learning model-space representations.

Method 251 improves upon method 100 by implementing new procedures to mitigate many deficiencies. For example, the data-space and model-space mappings for method 251 may be constructed using AE, VAE, and/or GANs. FIG. 3A illustrates an exemplary AE model 310 for learning data-space representations. FIG. 3B illustrates another exemplary AE model 320 for learning model-space representations. The data-space representation problem may be formulated as $\phi_E(\phi_D(u; W_{\phi_D}); W_{\phi_E})$, where function $\phi_E$ represents encoder 340, and function $\phi_D$ represents decoder 370. In some embodiments, encoder 340 may learn to map from data space u (e.g. regularly-sampled measurement data u*) to super attribute space $\bar{u}$, which may be a lower-dimensional space compared to data space u. The weights $W_{\phi_D}$ and $W_{\phi_E}$ of function $\phi_E$ and function $\phi_D$ may be learned through a training process which minimizes an objective functional, such as cross entropy. The input to AE model 310 is an image in the data space u (e.g. regularly-sampled measurement data u*), and the output is another image also in the data space u. The connection from the encoder 340 to decoder 370 is through a lower-dimensional super attribute space $\bar{u}$, such as u>>$\bar{u}$. Also, the model-space representation problem may be formulated as $\psi_E(\psi_D(\kappa; W_{\psi_D}); W_{\psi_E})$, where function $\psi_E$ represents encoder 380, and function $\phi_D$ represents decoder 390. In some embodiments, encoder 380 may learn to map from subsurface space $\kappa$ (e.g., cell-based prior subsurface images) to super parameter space $\bar{\kappa}$, which may be a lower-dimensional space compared to cell-based (or voxel-based or pixel-based) space $\kappa$. The weights $W_{\psi_D}$ and $W_{\psi_E}$ of function $\psi_E$ and function $\psi_D$ may be learned through a training process similar to data space representation learning process. The input to AE model 320 is an image in the subsurface space $\kappa$ (e.g., regularly-sampled cell-based prior subsurface images), and the output is another image also in the data space $\kappa$. The connection from the encoder 380 to decoder 390 is through a lower-dimensional super parameter space $\bar{\kappa}$, such that $\kappa$>>$\bar{\kappa}$.

Figure 4A:
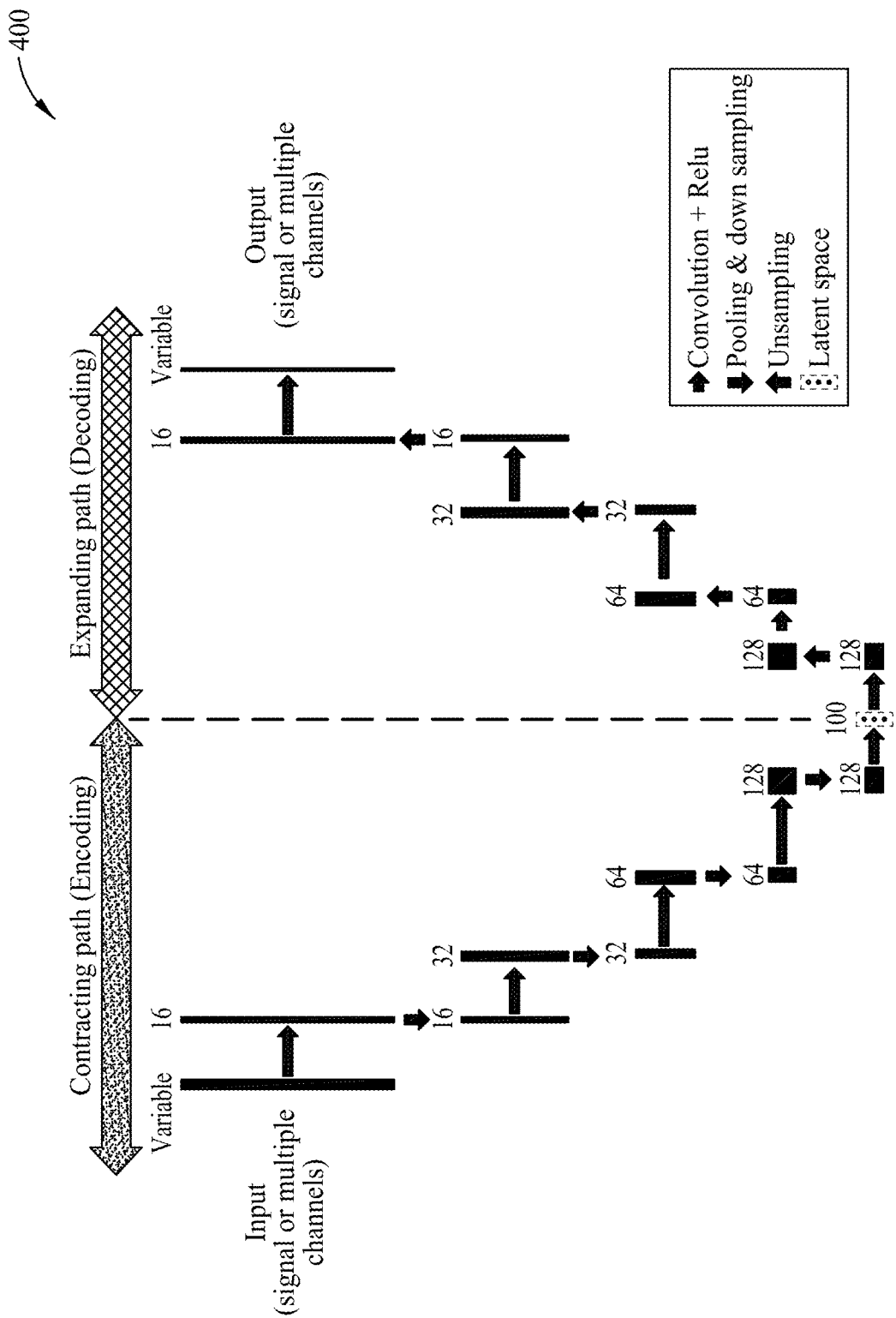
FIG. 4A illustrates an exemplary convolutional neural network.
Figure 4B:
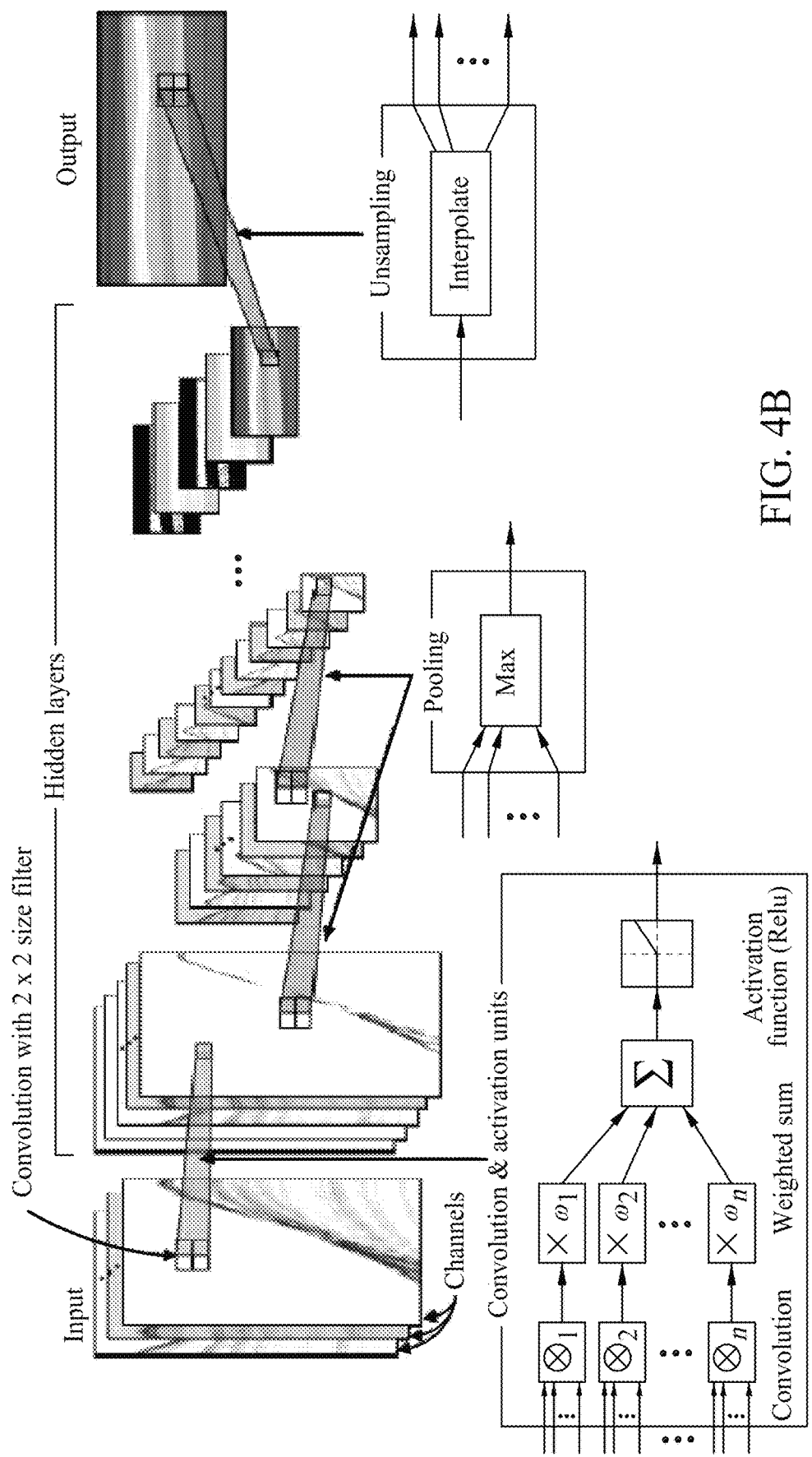
FIG. 4B illustrates the building blocks of the convolutional neural network of FIG. 4A.

In some embodiments, the architectures of encoders 340, 380, and decoders 370, 390, may be based on convolutional neural networks (CNNs). For example, CNN 400 is illustrated in FIG. 4A. The building blocks of CNN 400 are described in FIG. 4B. In some embodiments, these building blocks of CNN 400 are based on filters, activation functions, pooling, and/or upsampling operations. The super parameter and attribute spaces $\bar{\kappa}$ and $\bar{u}$ respectively may be flattened (vectorized).

In some embodiments, the architectures of encoders 340, 380, and decoders 370, 390 may include dropout layers during training and inversion processes. The term "dropout" refers to dropping-out nodes in a neural network, or filters in a convolutional neural network. By dropping a node or filter, the node may be removed from the networks along with all its connections. The choice of which node or filter to drop out could be random in both model and data space representation functions to generate stochastic search directions during inversion, which may overcome local minima challenges.

Figure 5:
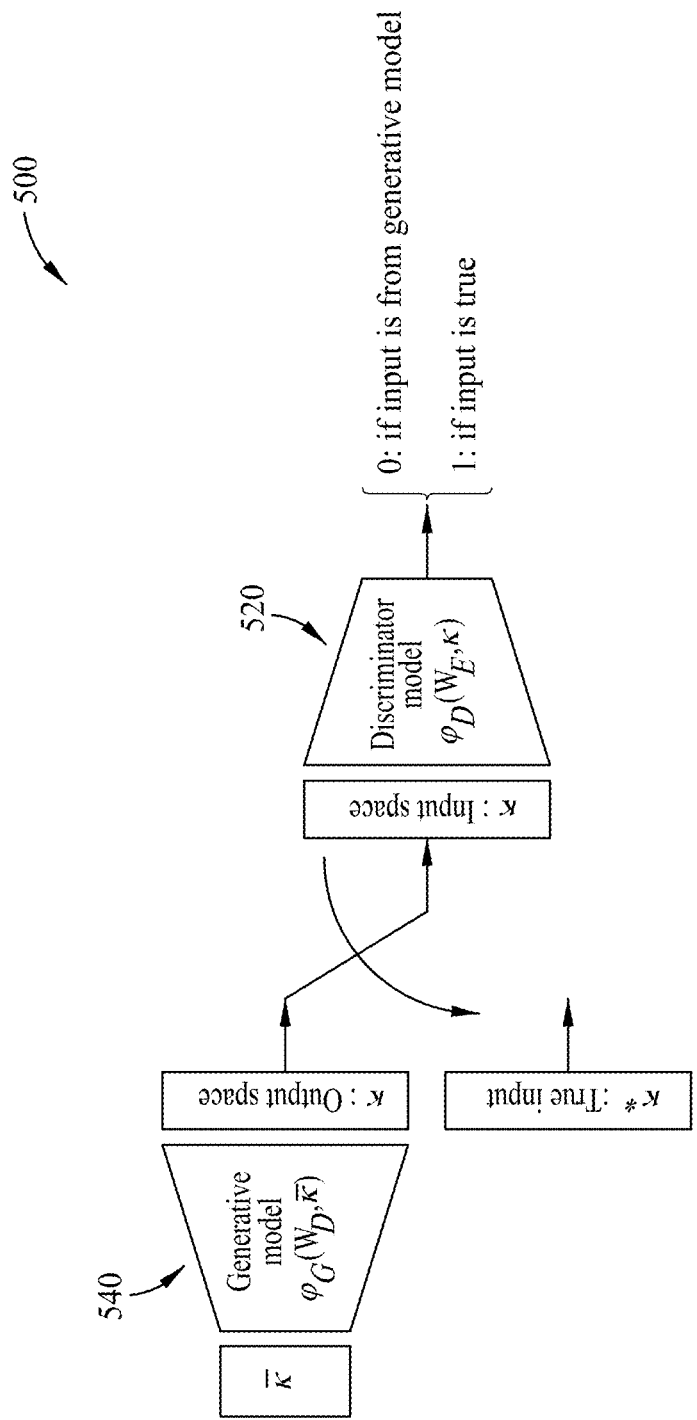
FIG. 5 illustrates an exemplary generative-adversarial networks model.

As another example, FIG. 5 illustrates an exemplary GAN model 500. The GAN model 500 is similar to AE models 310 and 320, but GAN model 500 may be trained in a different fashion. Generative model 540 behaves similarly to decoder 370, and discriminator model 520 behaves similarly to encoder 520. However, discriminator model 520 has a single-dimensional output that varies between 0 and 1. AEs and/or GANs may be used to learn representations for a set of data or subsurface models, typically for dimensionality reduction.

In the method 251 of FIG. 2C, the augmented forward model 235 is described by $\phi_E(f(\psi_D(\bar{\kappa}; W_{\psi_D})); W_{\phi_E})$. Method 251 also includes a gradient model 265 for computing the gradients of the objective functional formulated with the super attributes with respect to the super parameters. This gradient g is computed by $Z_{\psi_D}{}^T J^T Z_{\phi_E}{}^T \Delta\bar{u}$, where $Z_{\psi_D}{}^T$, $J^T$, and $Z_{\phi_E}{}^T$ are the Jacobians of the model encoder $\psi_D$, the physics-based forward model f, and data encoder $\psi_E$, respectively, and $\Delta\hat{u}$ corresponds to a data misfit at the super attribute space for a given objective functional. This gradient may be used as a search direction to find an update direction $\Delta\bar{\kappa}$ (e.g. $\Delta\bar{\kappa}=-\alpha g$ or $\Delta\bar{\kappa}=-H^{-1}g$ where $\alpha$ is a step size computed by a line search algorithm such as golden section search and $H^{-1}$ is the numerical inverse of Hessian) for minimizing the inversion objective functional.

The augmented forward model 235 maps the super parameter space to the super attribute space for given sets of weights $W_{\psi_D}$ and $W_{\phi_E}$ of the data- and model-space mapping functions. The weights may be learned through training processes. In some embodiments, the training processes may be completed as a batch before the inversion iterations begin. In some embodiments, the training processes may be carried out in an alternating fashion, in tandem with the inversion iterations. For example, a fraction of the training iterations of learning data and model space representations may be utilized for a fraction of the inversion iterations, and then an additional fraction of the training iterations may be utilized for an additional fraction of the inversion iterations. This iterative process may be repeated until convergence. The advantage with the alternating training and inversion strategy is that inversion is performed for only the learned features of the model and data spaces. This may avoid information overloading in the inversion process. This may also mitigate the possibility of the objective function becoming stuck at a local minimum before reaching a global minimum.

In some embodiments, the current technological advancement can enable the practical use of the global or probabilistic optimization methods such as simulated annealing, genetic algorithms, and/or particle swarm for solving Equation (3) because the size of the super parameter and attributes spaces may be suited for these algorithms.

Method 251 iterates until convergence. For example, objective function 255 may be tested for optimization/minimization. In some embodiments, user-input may determine the number of iterations (e.g., 10, 20, 50, or 100 iterations). In some embodiments, the iterations may continue as long as the misfit $\Delta\bar{u}$ continues to substantially decrease (e.g., by at least 5%) with each iteration. In some embodiments, the iterations may continue until the misfit Au is reduced to the noise floor in the geophysical data. In some embodiments, the iterations may continue as long as the model continues to substantially change with each iteration. For example, the model may be qualitatively inspected by a geoscientist. Visual inspection may ensure the results carry geologic and/or geophysical meaning.

Figure 9A:
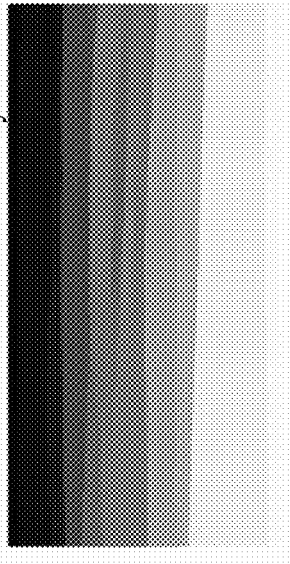
FIGS. 9A-9C illustrate exemplary sample velocity models.
Figure 9B:
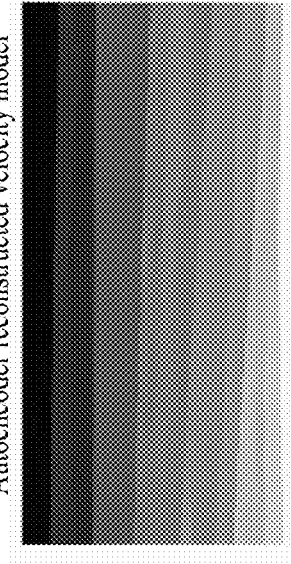
Figure 9C:
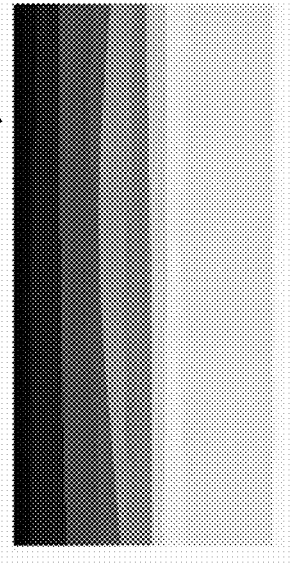
Figure 9D:
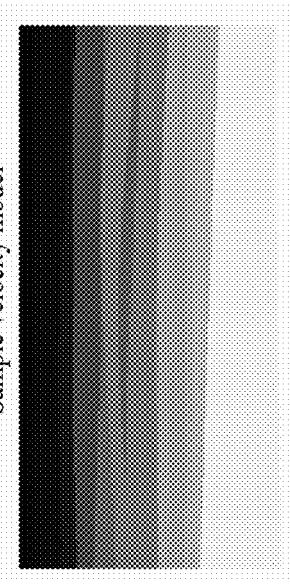
FIGS. 9D-9F illustrate exemplary autoencoder reconstructed velocity models.
Figure 9E:
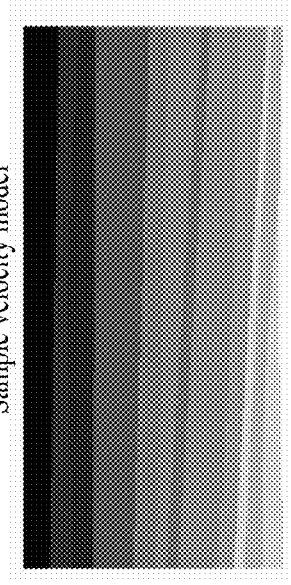
Figure 9F:
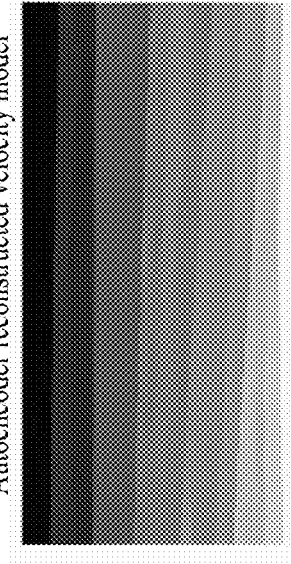

Example results have been generated by utilizing 10,000 samples of layered-subsurface models (e.g., sample velocity models in FIGS. 9A-9C and AE reconstructed velocity models in FIGS. 9D-9F). Acoustic simulations over these models have been performed to generate synthetic data using 256 receivers and 16 sources, each located at the surface of the models. Both sources and receivers are distributed over the surfaces in equal-distance intervals. The source temporal signatures are based on Ricker wavelets with 10 Hz pick frequency. The data has been collected at 512 time positions. Each shot gather is based on data space of 512×256 (number of temporal samples×number of receivers). Examples of the shot gather fields are shown in FIGS. 6A (sources positioned in the middle of the surface) and 8A (sources positioned at the right corner of the surface). (The shot gather in FIG. 6A is repeated in FIG. 7A.)

For the example results, AEs have been used to learn the representations of data and models from 9000 of the 10,000 samples of the velocity models and acoustic data obtained at 256 receivers using 16 sources positioned at the surface. The remaining 1000 samples are separated for testing and validation purposes. For learning data-space representations, two AEs are tested. The first AE learns the mapping from 512×256 to 100 super attribute space (~1310 compression rate), while the second AE learns the mapping to 200 super attribute space. Examples of the constructed shot gather fields from the first AE (100 dimensional attribute space) are shown in FIGS. 6B-6D (after partial trainings with 6 k iterations, 26 k iterations, and 75 k iterations, respectively). Examples of the constructed shot gather fields from the second AE (200 dimensional attribute space) are shown in FIGS. 7B-7D (after partial trainings with 6 k iterations, 26 k iterations, and 75 k iterations, respectively). Examples of constructed shot gather fields for a source located at the corner with the first AE (100 dimensional attribute space) are shown in FIGS. 8B-8D (after partial trainings with 6 k iterations, 26 k iterations, and 75 k iterations, respectively). The AEs learn the details of the wavefield as the number of iterations progresses. This approach may help the inversion processes to sort out the information, potentially mitigating local minima problems.

In practical applications, the present technological advancement may be used in conjunction with a seismic data analysis system (e.g., a high-speed computer) programmed in accordance with the disclosures herein. Preferably, in order to efficiently perform FWI, the seismic data analysis system is a high performance computer ("HPC"), as known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 10:
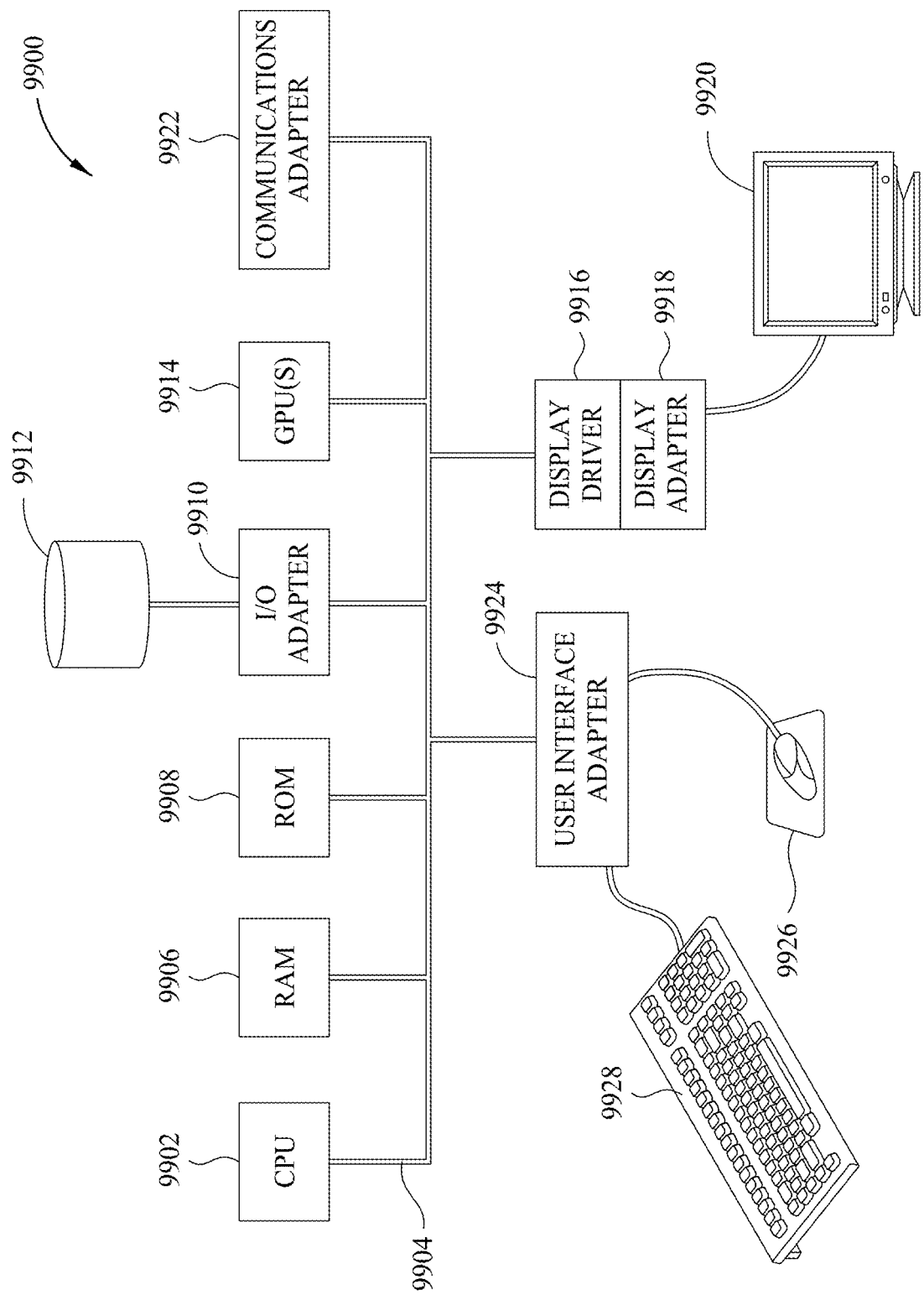
FIG. 10 illustrates a block diagram of a data analysis system upon which the present technological advancement may be embodied.

FIG. 10 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 10, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory ("RAM") 9906, which may be SRAM, DRAM, SDRAM, or the like. The system 9900 may also include additional non-transitory, computer-readable media such as a read-only memory ("ROM") 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; it may potentially also include one or more graphics processor units (GPUs) 9914, and one or more display driver(s) 9916.

The I/O adapter 9910 may connect additional non-transitory, computer-readable media such as a storage device(s) 9912, including, for example, a hard drive, a compact disc ("CD") drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models and/or data discussed herein. As the models and/or data themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits ("ASICs") or very large scale integrated ("VLSI") circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as autoencoders, variational autoencoders, generative-adversarial networks, convolutional neural networks, densely-connected network, and architectures that include dropout layers. The machine learning architectures may be trained on various training data sets. The machine learning architectures may be applied to analysis and/or problem solving related to various unanalyzed data sets. In should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon subsurface region maps constructed according to the above-described methods. In particular, such methods may include drilling a well, and/or causing a well to be drilled, based at least in part upon the seismic analysis with machine learning-augmented geophysical inversion (e.g., such that the well is located based at least in part upon a location determined from the subsurface region maps, which location may optionally be informed by other inputs, data, and/or analyses, as well) and further prospecting for and/or producing hydrocarbons using the well. The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of machine learning-augmented geophysical inversion, comprising:
    obtaining measured data for a subsurface region;
    obtaining prior subsurface data for the subsurface region;
    iteratively:
        partially training an autoencoder with the measured data and with learned weights from a previous iteration to learn a fraction of data space representations and generate a data space encoder;
        partially training the autoencoder with the prior subsurface data and with learned weights from the previous iteration to learn a fraction of model space representations and generate a model space decoder;
        forming an augmented forward model with the model space decoder, the data space encoder, and a physics based forward model; and
        solving an inversion problem with the augmented forward model to generate an inversion solution.

2. The method of claim 1, wherein the measured data comprises at least one of:
    data acquired from a geophysical survey of the subsurface region;
    data from a data library; and
    synthetic data.

3. The method of claim 1, wherein the prior subsurface data comprises at least one of:
    subsurface geophysical models;
    subsurface images;
    analog subsurface geophysical models;
    analog subsurface images;
    well logs;
    estimates of values of geophysical properties as a function of depth in the subsurface region; and
    data from a subsurface library.

4. The method of claim 1, wherein the inversion problem comprises at least one of:
    full-wavefield inversion;
    seismic tomography;
    gravity inversion;
    magnetic inversion; and
    electromagnetic inversion; and
    wherein solving the inversion problem comprises at least one of:
        a global optimization method; and
        a gradient-based optimization method.

5. The method of claim 1, wherein an objective functional of the inversion problem is formulated in a super attribute space of the augmented forward model.

6. The method of claim 1, wherein an objective functional of the inversion problem includes regularization terms in a super parameter space of the augmented forward model and a discretized space of the physics based forward model.

7. The method of claim 1, wherein the model space decoder and the data space encoder comprise variational autoencoders.

8. The method of claim 7, wherein the trainings are based on at least one of:
    convolutional neural network architectures; and
    densely-connected network architectures.

9. The method of claim 1, wherein the model space decoder and the data space encoder comprise combined variational autoencoders and generative-adversarial network models.

10. The method of claim 1, wherein the inversion solution comprises proposed subsurface geophysical models.

11. The method of claim 1, further comprising utilizing the inversion solution to manage hydrocarbons.

12. The method of claim 1, wherein solving the inversion problem with the augmented forward model to generate an inversion solution comprises partially solving the inversion problem.

13. The method of claim 12, wherein partially solving of the inversion problem comprises:
    performing iterations towards minimizing an inversion objective functional; and
    terminating solving the inversion problem prior to the inversion solution converging to a predefined minimum.

14. The method of claim 1, wherein in one iteration, partial training of the autoencoder is for learning one of only direct arrival events or only primary reflection events; and
    wherein in another iteration, partial training of the autoencoder is for learning another of only direct arrival events or only primary reflection events.

15. A method of machine learning-augmented geophysical inversion, comprising:
  obtaining measured data for a subsurface region;
  obtaining prior subsurface data for the subsurface region;
  (a) partially training a data autoencoder with the measured data to learn a fraction of data space representations and generate a data space encoder;
  (b) partially training a model autoencoder with the prior subsurface data to learn a fraction of model space representations and generate a model space decoder;
  (c) forming an augmented forward model with the model space decoder, the data space encoder, and a physics based forward model;
  (d) solving an inversion problem with the augmented forward model to generate an inversion solution; and
  iteratively repeating (a)-(d) until convergence of the inversion solution, wherein, for each iteration:
    partially training the data autoencoder starts with learned weights from an immediately-previous iteration;
    partially training the model autoencoder starts with learned weights from the immediately-previous iteration; and
    solving the inversion problem starts with super parameters from the previous iteration.

16. The method of claim 15, wherein the measured data comprises at least one of:
  data acquired from a geophysical survey of the subsurface region;
  data from a data library; and
  synthetic data.

17. The method of claim 15, wherein the prior subsurface data comprises at least one of:
  subsurface geophysical models;
  subsurface images;
  analog subsurface geophysical models;
  analog subsurface images;
  well logs;
  estimates of values of geophysical properties as a function of depth in the subsurface region; and
  data from a subsurface library.

18. The method of claim 15, wherein, for each iteration, the inversion problem comprises at least one of:
  full-wavefield inversion;
  seismic tomography;
  gravity inversion;
  magnetic inversion; and
  electromagnetic inversion.

19. The method of claim 15, wherein, for each iteration, solving the inversion problem comprises at least one of:
  a global optimization method; and
  a gradient-based optimization method.

20. The method of claim 15, wherein, for each iteration, an objective functional of the inversion problem is formulated in a super attribute space of the augmented forward model.

21. The method of claim 15, wherein, for each iteration, an objective functional of the inversion problem includes regularization terms in a super parameter space of the augmented forward model and a discretized space of the physics based forward model.

22. The method of claim 15, wherein, for each iteration, the model space decoder and the data space encoder comprise variational autoencoders.

23. The method of claim 15, wherein, for each iteration:
  the autoencoder comprises a generative-adversarial network,
  the data space encoder corresponds to a generative model of the generative-adversarial network, and
  the model space decoder corresponds to a discriminator model of the generative-adversarial network.

24. The method of claim 15, wherein, for each iteration, the model space decoder and the data space encoder comprise combined variational autoencoders and generative adversarial network models.

25. A method for generating an image of a subsurface region comprising:
  obtaining measured data for a subsurface region;
  obtaining prior subsurface data for the subsurface region;
  iteratively:
    partially training an autoencoder with the measured data and with learned weights from a previous iteration to learn a fraction of data space representations and generate a data space encoder;
    partially training the autoencoder with the prior subsurface data and with learned weights from the previous iteration to learn a fraction of model space representations and generate a model space decoder;
    forming an augmented forward model with the model space decoder, the data space encoder, and a physics based forward model;
    solving an inversion problem with the augmented forward model to generate an inversion solution comprising a proposed geophysical model; and
    generating an image of the proposed geophysical model.

* * * * *